US012573916B2

(12) United States Patent
Häfner

(10) Patent No.: US 12,573,916 B2
(45) Date of Patent: Mar. 10, 2026

(54) EXTERNAL ROTOR MOTOR WITH A COOLING WHEEL FOR COOLING THE STATOR

(71) Applicant: ebm-papst Mulfingen GmbH & Co. KG, Mulfingen (DE)

(72) Inventor: Jochen Häfner, Blaufelden (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 157 days.

(21) Appl. No.: 17/881,735

(22) Filed: Aug. 5, 2022

(65) Prior Publication Data

US 2023/0043728 A1 Feb. 9, 2023

(30) Foreign Application Priority Data

Aug. 9, 2021 (DE) ..................... 10 2021 120 673.1

(51) Int. Cl.
 *H02K 9/06* (2006.01)
 *H02K 5/15* (2006.01)
(52) U.S. Cl.
 CPC ................. *H02K 9/06* (2013.01); *H02K 5/15* (2013.01)
(58) Field of Classification Search
 CPC .. H02K 1/2786; H02K 1/2787; H02K 1/2788; H02K 1/2789; H02K 9/04; H02K 9/06; H02K 9/08; H02K 9/10; H02K 9/12
 See application file for complete search history.

(56) References Cited

U.S. PATENT DOCUMENTS

| | | | |
|---|---|---|---|
| 5,698,913 A | 12/1997 | Yagi et al. | |
| 2004/0189137 A1* | 9/2004 | Hashimoto | H02K 29/03 310/402 |
| 2005/0125989 A1* | 6/2005 | Lee | H02K 15/022 29/598 |
| 2014/0306559 A1* | 10/2014 | Stillger | H02K 9/14 310/59 |

(Continued)

FOREIGN PATENT DOCUMENTS

| | | | |
|---|---|---|---|
| CN | 205141922 U | 4/2016 | |
| DE | 102006041122 A1 | 4/2007 | |
| WO | WO-2017148415 A1 * | 9/2017 | H02K 9/04 |

OTHER PUBLICATIONS

WO-2017148415-A1 Machine Translation (Year: 2017).*

(Continued)

*Primary Examiner* — Oluseye Iwarere
*Assistant Examiner* — Masoud Vaziri
(74) *Attorney, Agent, or Firm* — Harness, Dickey & Pierce, P.L.C.

(57) ABSTRACT

An external rotor motor (1) has a stator (10), a rotor (20) and a cooling wheel (30) that rotates with the rotor (20) and the stator (10) to cool the stator (10). The stator (10) has an inner portion (11), enabling fluid flow, and a surrounding outer portion (12) enabling fluid flow. The flow is fluidically separate from the inner portion (11) in the radial direction (X). The cooling wheel (30) has a plurality of blades (33) to generate an overpressure and a negative pressure. The cooling wheel (30) generates a directed air flow (L) flowing from the outer diameter (32) of the cooling wheel (30) through the outer portion (12) and the inner portion (11) to the inner diameter (31) of the cooling wheel (30).

6 Claims, 1 Drawing Sheet

(56)          References Cited

U.S. PATENT DOCUMENTS

| 2015/0188392 A1* | 7/2015 | Haag | ........................ H02K 9/06 |
| | | | 310/59 |
| 2018/0145574 A1* | 5/2018 | Mccaw | .................... H02K 9/06 |
| 2019/0190325 A1* | 6/2019 | Nakahara | ............. H02K 15/022 |
| 2021/0091610 A1* | 3/2021 | Walter | ................... H02K 1/148 |

OTHER PUBLICATIONS

Extended European Search Report dated Jan. 4, 2023 in corresponding European Application No. 22187218.7.
GPTO Search Report issued in corresponding Germany Patent Application No. 10 2021 120 673.1 on Aug. 9, 2021, 10 pages.
European Office Action dated Sep. 18, 2025 in corresponding European Application No. 22 187 218.7.

* cited by examiner

EXTERNAL ROTOR MOTOR WITH A COOLING WHEEL FOR COOLING THE STATOR

CROSS-REFERENCE TO RELATED APPLICATION

This application claims the benefit and priority of German Application No. 10 2021 120 673.1, filed Aug. 9, 2021. The entire disclosure of the above application is incorporated herein by reference.

FIELD

The disclosure relates to an external rotor motor with a stator, a rotor and a cooling wheel that can be rotated about an axis of rotation with the rotor and the stator for cooling the stator by a directed air flow.

BACKGROUND

A large number of electric motors are known from the prior art where the rotor and/or stator are cooled. The cooling of the electric motor or its components is decisive for its power density, since cooling or improved cooling of the electric motor can generate a correspondingly higher motor power.

Particularly in the case of external rotor motors where the rotor rotates around a stator arranged inside the rotor, an undefined air flow is usually used in the prior art. The air can be swirled and the heat from the stator can be dissipated only in an undefined or comparatively inefficient way.

The object of the disclosure is to overcome the aforementioned disadvantages and provide an external rotor motor with cooling where a defined and high level of cooling of the motor can be implemented and a correspondingly high power density of the electric motor is achievable.

SUMMARY

This section provides a general summary of the disclosure, and is not a comprehensive disclosure of its full scope or all of its features.

The object is achieved by an external rotor motor comprising a stator, a rotor and a cooling wheel that rotates about an axis of rotation with the rotor and the stator for cooling the stator. The stator has an inner portion, where fluid can flow parallel to the axis of rotation and an outer portion, where fluid can flow parallel to the axis of rotation. The outer portion annularly surrounds the inner portion and is fluidically separated from the inner portion in the radial direction. The cooling wheel includes a plurality of blades arranged and positioned adjacent to the stator to generate an overpressure, at an outer diameter of the cooling wheel adjacent to the outer portion, and a negative pressure, at an inner diameter of the cooling wheel adjacent to the inner portion. The cooling wheel generates a directed air flow flowing from the outer diameter of the cooling wheel through the outer portion and the inner portion to the inner diameter of the cooling wheel.

According to the disclosure, an external rotor motor includes a stator, a rotor and a cooling wheel. The cooling wheel rotates about an axis of rotation with the rotor and the stator to cool the stator. The stator has an inner portion, where air can flow parallel to the axis of rotation, and an outer portion, where air can flow parallel to the axis of rotation. The outer portion annularly surrounds the inner portion and is fluidically separated from the inner portion. Thus, in the radial direction, particularly in the region of the stator, at least in the stator, no direct air flow from the outer portion to the inner portion is possible. The cooling wheel has a plurality of blades that are arranged and formed adjacent and preferably immediately adjacent to the stator. The cooling wheel generates an overpressure, on an outer diameter of the cooling wheel adjacent to the outer portion of the stator, and a negative pressure, on an inner diameter of the cooling wheel adjacent to the inner portion of the stator. Thus, a directed air flow is generated flowing from the outer diameter of the cooling wheel through the outer portion and the inner diameter of the cooling wheel through the inner portion.

Since the blades are adjacent, and preferably immediately adjacent to the stator, the air cannot flow directly from the overpressure region, on the outer diameter of the cooling wheel or outer portion of the stator, to the negative pressure region, on the inner diameter of the cooling wheel or inner portion of the stator. The air must flow through the outer portion and through the inner portion of the stator or flow through the stator.

The cooling wheel or the blades of the cooling wheel have an air gap with respect to the stator. The air gap allows the cooling wheel to rotate relative to the stator, but prevents any direct air flow or return flow of the air from the outer diameter or outer portion to the inner diameter or inner portion when the cooling wheel is rotating. This can be achieved by making the air gap correspondingly narrow or by arranging the blades of the cooling wheel correspondingly close to the stator.

To equalize the air pressure between the region with the overpressure at the outer diameter of the cooling wheel and the region with the negative pressure at the inner diameter of the cooling wheel, a directed air flow is generated by the flow-through portions (outer portion, inner portion) of the stator. The regions are fluidically connected on a side of the stator facing away from the cooling wheel. Thus, the air flowing through the stator, particularly in the region of the outer portion of the stator, absorbs heat and dissipates it to cooler regions of the stator or of the external rotor.

In an advantageous development of the external rotor motor, the cooling wheel is fixed on a side of a bearing shield, facing the stator, via which the rotor is rotatably mounted on the stator.

For this purpose, the cooling wheel can have locking elements, for example, that latch to counter-locking portions provided by the bearing shield. Thus, the cooling wheel is fixed in the radial direction and direction of rotation about the axis of rotation on the bearing shield.

Also, the external rotor motor has a housing that surrounds the stator. The housing is rotatable with the rotor and is closed on one side by the bearing shield. Thus, it can be shaped or designed as a rotor bell. A case formed by the housing and the bearing shield is fluidically tight. Fluidically tight is to be understood as meaning that the case separates the stator in an airtight manner from an outside environment or at least prevents any relevant air flow for the cooling of the stator through the case.

In order to support transfer of heat from the air flow to cooler regions of the external rotor motor, cooling ribs are provided on the housing and/or the bearing shield. The ribs can dissipate the heat from the air flow. The heat is absorbed, for example, from the stator windings or generally the outer portion of the stator and correspondingly transported with the air flow. Accordingly, the heat from the stator windings can be transferred to the air transported with the air flow and delivered from the air in particular via the cooling ribs to the housing and/or the bearing shield or the case. Thus, the housing transports the heat to the outside or into the environment surrounding the case and the stator windings can be cooled.

A clearance enables an air flow between the outer and the inner portion of the stator on the side of the stator facing away from the cooling wheel. According to an advantageous development, on a side of the stator facing away from the cooling wheel along the axis of rotation, the clearance is provided connecting the outer portion fluidically to the inner portion. The clearance can be delimited, for example, by the stator and the housing. Alternatively, the clearance or a portion connecting the outer portion to the inner portion can also be formed inside the stator and preferably on an end of the stator facing away from the cooling wheel.

The stator can have a plurality of stator teeth. Each tooth has a winding portion to accommodate stator windings in the outer portion of the stator and a connection portion to connect the stator to an axis of the electric motor in the inner portion of the stator. In this case, spaces between the windings or spaces between the winding portions of the stator teeth can preferably be flowed through. In the region of the connection portions, preferably spaces between the connection portions of the stator teeth can be flow through, or cooling channels are provided for this purpose.

According to an advantageous development, the stator includes a plurality of individual teeth that are mechanically connected to one another in the circumferential direction at a connecting portion. The stator can have a ring element that fluidically separates the inner portion from the outer portion. If the stator includes a plurality of individual teeth, the ring element can be formed by the connecting portions of the individual teeth. Thus, the connecting portions of the plurality of individual teeth that are connected to one another form the ring element. If a ring element fluidically separates the inner portion from the outer portion, the ring element preferably extends parallel to the axis of rotation along the entire stator.

The ring element is preferably completely closed in the circumferential direction about the axis of rotation and extends parallel to the axis of rotation. Preferably, it is completely closed over the entire length of the stator and can correspondingly enable the fluidic separation of the outer portion and the inner portion of the stator in such a way that the air flow first has to flow through the outer region and then through the inner region of the stator to allow pressure equalization between the overpressure and the negative pressure.

More preferably, the blades of the cooling wheel run immediately adjacent and at least partially parallel to the ring element. Thus, a narrow air gap is determined between the ring element and the blades or an interface of all blades of the cooling wheel facing the ring element. The air gap is designed so that the cooling wheel can rotate freely in relation to the stator, but the air cannot flow back or flow from the outer portion to the inner portion.

A variant is also advantageous where the cooling wheel has a closed ring where the blades run in the radial direction and project parallel to the axis of rotation in the direction of the stator.

At the same time, the ring can be used for assembly on the bearing shield. For example, it can lie flat on the bearing shield and/or have locking elements for locking with counter-locking elements of the bearing shield.

The features disclosed above can be combined as desired, insofar as this is technically possible and they do not contradict one another.

Further areas of applicability will become apparent from the description provided herein. The description and specific examples in this summary are intended for purposes of illustration only and are not intended to limit the scope of the present disclosure.

DRAWINGS

Other developments of the disclosure are included in the dependent claims or are listed below together with the description of the preferred embodiment of the disclosure based on the figures. In particular:

DETAILED DESCRIPTION

Example embodiments will now be described more fully with reference to the accompanying drawings.

The figures are schematic by way of example. The same reference numbers in the figures indicate the same functional and/or structural features.

Figure 1:
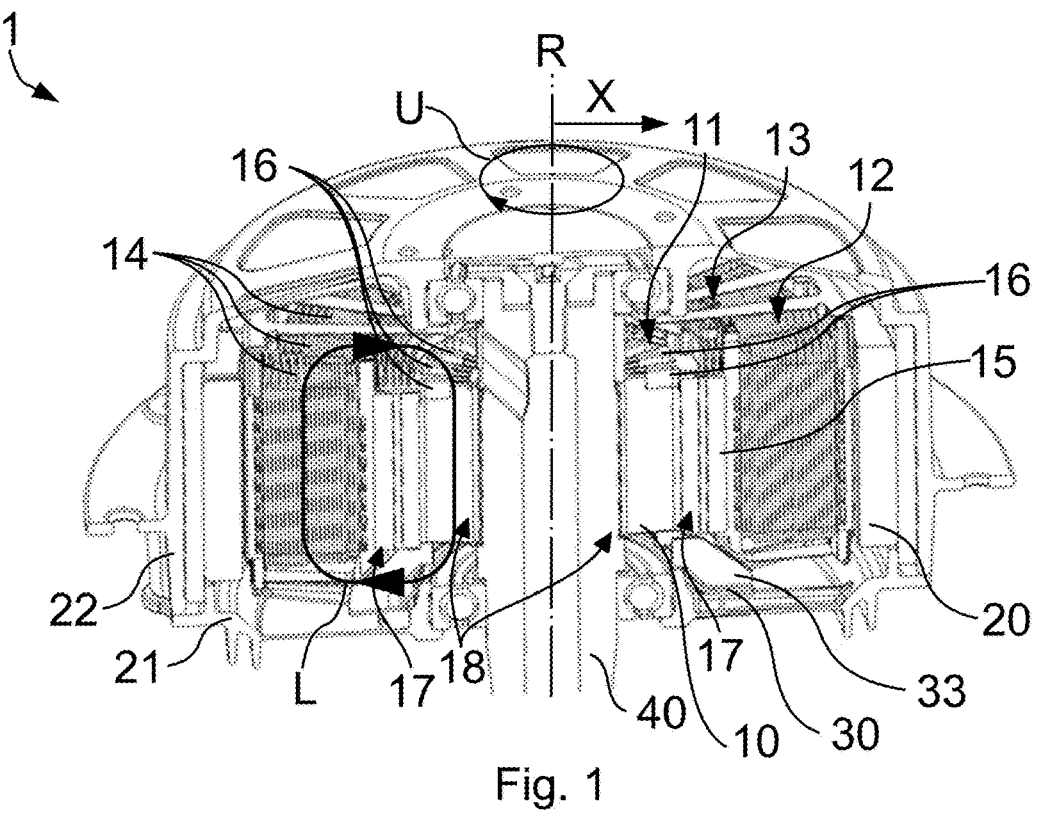
FIG. 1 is a cross-section view through an external rotor.
Figure 2:
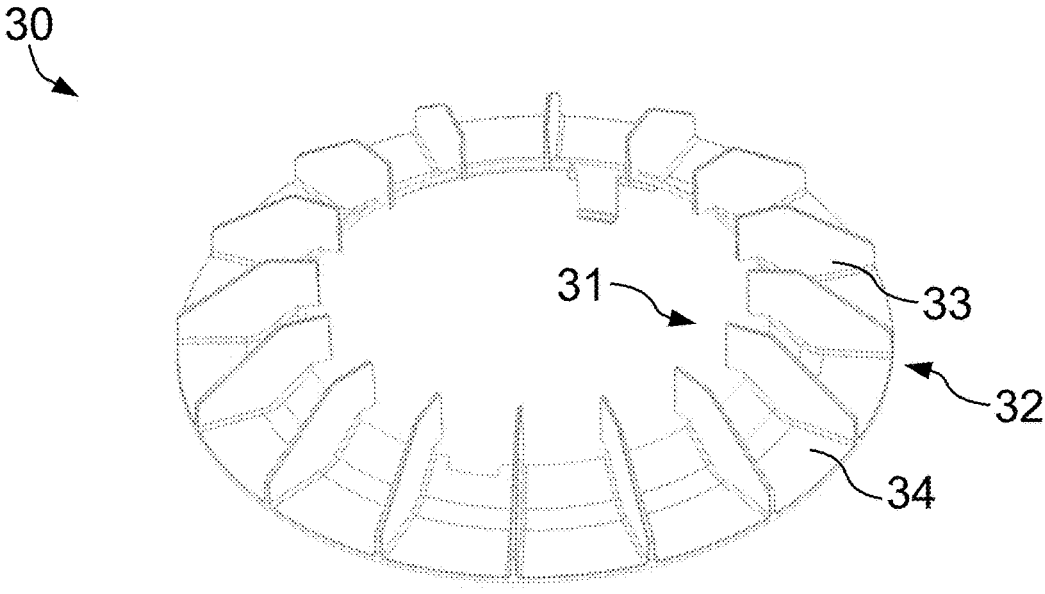
FIG. 2 is a perspective view of the cooling wheel of an external rotor.

FIG. 1 shows a sectional view of an external rotor motor 1, shown in perspective, with a cooling wheel 30 used in the external rotor motor 1, according to FIG. 1 being shown in FIG. 2. In this case, the rotor 20 can rotate about the stator 10 or about the axis of rotation R. The rotor 20 is firmly connected to the housing 22 and via the housing to the bearing shield 21. The rotor 20 is fixed on the axis 40, via a connecting portion 18, with which the stator 10 is rotatably connected, via the housing 22 and bearing shield 21 via bearings provided for this purpose, such as to rotate about the axis of rotation R.

In the present case, the bearing shield 21 is connected to the housing 22 and sealed against it. Thus, the case formed by the housing 22 and the bearing shield 21 is substantially airtight and air flow is prevented in and out of the case.

The stator 10 has a radially inner portion 11, through which air can flow, and a radially outer portion 12, through which air can flow. Thus, the latter is further away in the radial direction X from the axis of rotation R than the inner portion 11.

The inner portion 11 is fluidically separated from the outer portion 12 by a ring element 15, so that no air can flow between the inner portion 11 and the outer portion 12 at least on or in the stator 10.

A cooling wheel 30 is rotatably fixed to the bearing shield 21 with the rotor 20. The cooling wheel 30 generates a negative pressure on its inner diameter 31 and an overpressure on its outer diameter 32. This is due to its rotation about the axis 40 or about the axis of rotation R and due to its blades 33.

An upper edge of the blades 33 of the cooling wheel 30 extend, at least in portions, parallel and adjacent to the ring element 15. An air gap is formed between the ring element 15 and the blades 33 or the upper edges of all blades 33. This enables free rotation of the cooling wheel 30 relative to the stator while hindering or preventing a direct back flow of air between the stator 10 and the cooling wheel 30 from the region with positive pressure to the region with negative pressure.

To equalize the pressure in the case, the overpressure and the negative pressure generate a directed air flow L from the outer diameter 32 of the cooling wheel 30 through the outer portion 12 in a clearance 13, that is opposite to the bearing shield 21 with respect to the stator 10, and from the clearance 13 through the inner portion 11 to the inner diameter 31 of the cooling wheel 30. The clearance 13 fluidically connects the outer portion 12 with the inner portion 11 of the stator 10 and is delimited along the axis of rotation R by the stator 10 and the housing 22.

The directed air flow L or the air transported by the air flow L absorbs heat as it flows through the outer portion 12 of the stator 10 from stator windings 14, wound on individual stator teeth 16 of the stator 10, and transfers the heat to cooler regions of the external rotor motor 1. The teeth 16 are mechanically connected to one another at a connecting portion 17 in the circumferential direction. For example, it transfers the heat to the housing 22, the inner portion 11 or the axle 40 in order to cool the outer portion 12 or the stator windings 14 in a defined way by the directed air flow L.

The implementation of the disclosure is not limited to the preferred exemplary embodiments specified above. Rather, a number of variants are conceivable that make use of the solution shown even in the case of fundamentally different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An external rotor motor comprising:
   a stator, a rotor and a cooling wheel that rotates about an axis of rotation with the rotor for cooling the stator;
   the stator has an inner portion, where fluid can flow parallel to the axis of rotation, and an outer portion, where fluid can flow parallel to the axis of rotation, the outer portion annularly surrounds the inner portion and is fluidically separated from the inner portion in the radial direction, the stator has a plurality of stator teeth, the stator includes the plurality of stator teeth that are mechanically connected to one another at a connecting portion in the circumferential direction, each has a winding portion for receiving stator windings in the outer portion of the stator and a connecting portion for connecting the stator to an axis of the electric motor in the inner portion of the stators, spaces are between adjacent winding portions to enable air to flow through the spaces for cooling the stator;
   the cooling wheel, including a plurality of blades arranged and positioned adjacent to the stator, generates an overpressure, at an outer diameter of the cooling wheel adjacent to the outer portion, and a negative pressure, at an inner diameter of the cooling wheel adjacent to the inner portion, the cooling wheel generating a directed air flow flowing from the outer diameter of the cooling wheel through the outer portion and the inner portion to the inner diameter of the cooling wheel and the cooling wheel is fixed on one side of a bearing shield facing the stator, via which the rotor is rotatably mounted on the stator.

2. The external rotor motor of claim 1,
   further comprising a housing surrounding the stator, the housing rotating with the rotor and is closed on one side by the bearing shield,
   a case formed by the housing and the bearing shield is fluidically tight.

3. The external rotor motor of claim 1, further comprising a clearance fluidically connecting the outer portion to the inner portion at one side of the stator facing away from the cooling wheel along the axis of rotation.

4. The external rotor motor of claim 1,
   wherein the stator has a ring element fluidically separating the inner portion from the outer portion.

5. The external rotor motor of claim 4,
   wherein the ring member extends parallel to the axis of rotation along the entire stator.

6. The external rotor motor according to claim 1,
   wherein the cooling wheel has a closed ring where the blades extend in the radial direction and the blades protrude parallel to the axis of rotation in the direction of the stator.

\* \* \* \* \*